United States Patent Office 3,100,094
Patented Aug. 6, 1963

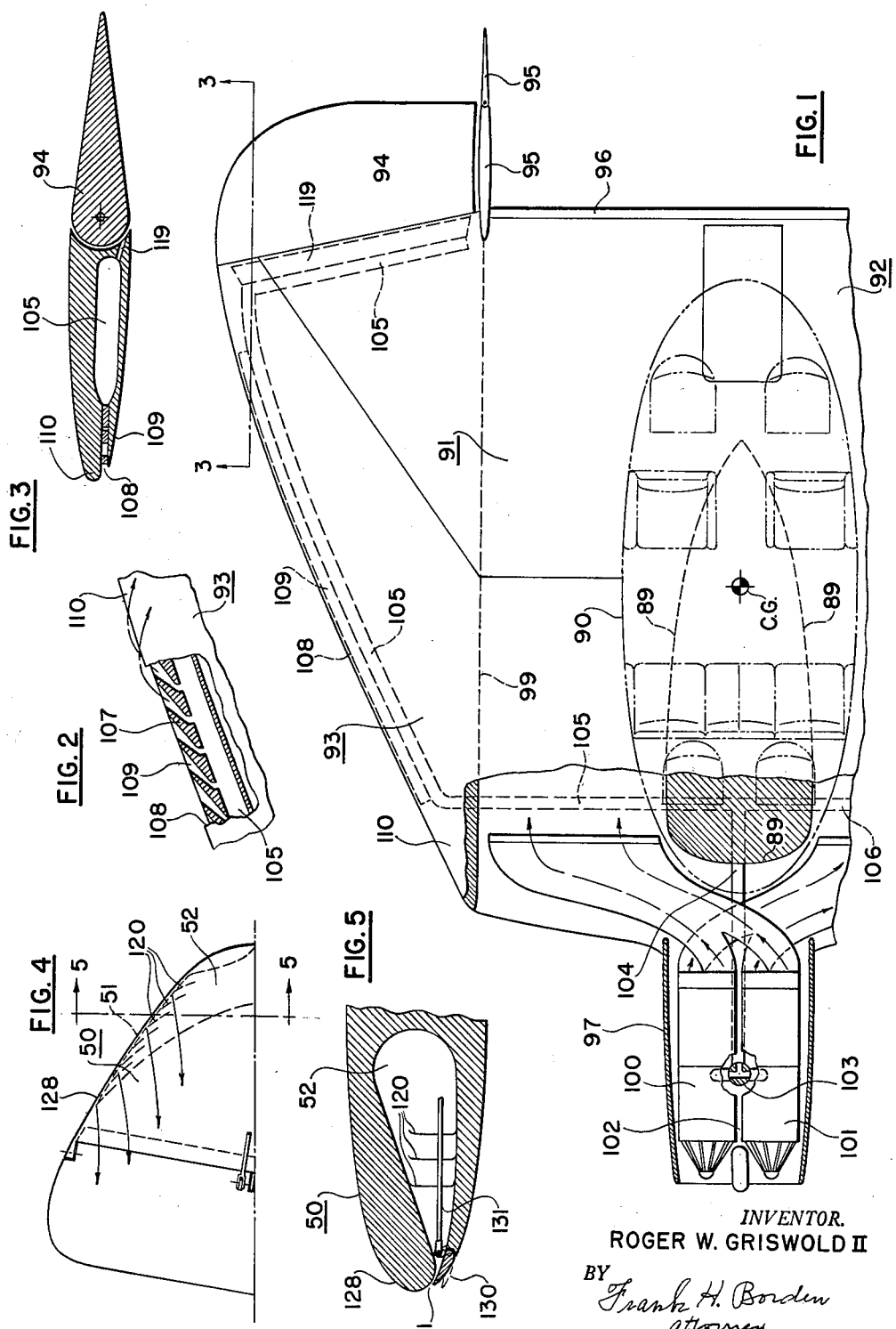

3,100,094
SWEPTWING JET FLOW CONTROL MEANS
Roger W. Griswold II, Old Lyme, Conn.
Filed Nov. 21, 1960, Ser. No. 70,833
5 Claims. (Cl. 244—42)

This invention relates primarily to leading edge blowing jets for sweptwing aircraft, and in particular to flow directing means therefor effective to align the jet with the local flow over the wing.

This constitutes a continuation in part of application 513,020 entitled Inherent Spiral Stability System, filed June 3, 1955, now Patent No. 3,027,119, and also of application 538,690, entitled Integrated Jetwing Aircraft, filed October 5, 1955, and now abandoned.

The primary object of the invention is to control the direction of the jet discharge in alignment with the local flow over the leading edge of the sweptwing which flows, at relatively high angles of attack, in semi-volute streamline paths spanwisely and rearwardly from the lower to the upper surface, so as to delay separation of the flow thereover with ultimate degeneration in the stall phenomenon, thus increasing the lift and reducing the drag of the wing accordingly.

In the accompanying drawings forming part of this description:

FIG. 1 represents a fragmentary plan view partially in section of an aircraft incorporating dual turbojet power plants, a high pressure air duct leading from the compressor section of each engine and siamesed through a common three way valve to permit bleeding compressed air selectively from either engine alone and from both together, and to shut off any such bleed air, the compressor bleed duct communicating with lower surface leading edge blowing jet nozzles extending over a substantial part of the swept wing tips, with internal diffusers incorporated in such nozzles effective to expand the jet efflux internally down to subsonic velocities at its point of confluence with the external local flow and to direct the resultant mixed flow generally in helical or semi-volute streamline paths over the contiguous sweptback leading edge and thence generally rearwardly and chordwisely over the upper surface of the wing so as to induce powerfully increased circulation and control of flow separation over the upper surface, the compressor bleed duct also communicating with lower surface blowing jet nozzles adjacent to the elevon control surfaces so as to provide longitudinal and lateral control of the aircraft preferably with supersonic efflux flow, in this latter instance.

FIG. 2 represents a fragmentary enlarged plan view, partially in section, of a portion of the sweptback wing tip leading edge of FIG. 1 wherein the compressor bleed air supply is partially discharged through spaced apertures and associated nozzles comprising flow expander passages formed by flow directing guide vanes.

FIG. 3 represents a wing chordwise cross-section taken on line 3—3 of FIG. 1, showing the local configuration of the transient-use compressor bleed blowing jet systems in the tip region of the wing.

FIG. 4 represents a plan view of a sweptback wing portion of an airplane incorporating the blowing jet nozzle and efflux guide vanes of the invention as indicated in dotted lines.

FIG. 5 represents a spanwise cross-section of a wing portion taken on line 5—5 of FIG. 4, having leading edge blowing jet flow control means including efflux guide vanes as in FIG. 4, and adjustable nozzle control means to vary the blowing jet mass flow.

Referring to FIGURES 1, 2 and 3, the airplane comprises a fuselage 90, oppositely extending ducted airfoil wings 91 and 92, comprising the central wing portion of the airplane, wherein the ducted airfoil sections, to be described, extend effectively throughout the central wing portion, being defined spanwisely in part by inboard duct wall 89 and outboard duct wall 99, and in the remainder by the outboard duct walls 99. The central wing portion thus defined carries sweptback wing tip portions 93, comprised basically of conventional airfoil sections, but modified as later recited, extending laterally from the wings 91 and 92 and together therewith comprising an integrated jet-wing for the airplane but not the complete system therefor. Elevons 94 are pivotally mounted on said tip portions 93 immediately outboard of fin and rudder vertical tail surfaces 95—95, which latter are respectively in substantial alignment with outboard walls 99. A suction slot 96 is disposed in the trailing edge of the central wing portion.

An engine nacelle 97 is provided in advance of and faired into wings 91 and 92, and houses the primary power plants for the aircraft, which constitute an essential component of a complete integrated jet-wing system, comprising in the present instance, two turbojet engines 100 and 101, supplied with combustion air and supplemental engine cooling and ducted wing airflow through common duct 102 therefor. By a three-way-flow valve organization 103 high pressure air can be bled or completely shut-off from the compressor section of either or both turbojets. Common conduit 104 receives compressor bleed air from valve 103 and leads into divergent conduits 105 and 106 extending into the respective wing tip portions 93—93 adjacent to the leading edge and trailing edges thereof.

As shown in FIGS. 2 and 3, the compressed air conduit 105 communicates through nozzle lip 109 comprised of multiple apertures leading from conduit 105 between flow expander and directing vanes 107 into lower surface slot 108 disposed in leading edge 110 of tip portion 93, whereby the compressor bleed air is partially discharged and expanded supersonically within the divergent passages formed by vanes 107 and the internal faces of lip 109 such that its velocity upon contact with the external local flow has preferably been reduced to a relatively high subsonic efflux velocity, so that the jet accordingly is comprised of a relatively thin fluid sheet which, due to the generally outward and rearward directional control effectde thereon by vanes 107, follows helical streamline paths over the rounded leading edge 110 and the rearward upward surface (as shown by the arrows in FIG. 2) to preclude separation of the local flow thereover and provide powerful supplemental augmentation of the circulation over the entire integrated jet-wing of the aircraft. Slot 108 is preferably disposed in substantial coincidence with the front stagnation point on leading edge 110 at normal cruising speeds, so as to avoid laminar flow transition when the jet is inoperative.

At the trailing edge of the fixed wing tip portion 93 conduit 105 communicates with choked-nozzle slot 119 which discharges a high velocity jet, preferably expanding externally to supersonic velocities downstream over the lower surface of elevon 94, to provide control, primarily by direct jet reaction at ultra slow speeds, and, due to the jet induced pressure differentials, by increased effectiveness of the elevon at higher operating speeds, when the jet is operative to provide these secondary effects, such control effects being adequate to both longitudinal and lateral control requirements, by operation of the elevons together and differentially, respectively, throughout the full speed range of the aircraft.

It will be understood that the above described compressor bleed flow control systems, are ordinarily intended for transient use in the low speed range, i.e. primarily during take-off, climb-out, approach and landing operations. It will further be noted that the flow through the leading edge duct can be sufficiently hot to provide anti-icing for the leading edge sections of the wing.

It will be understood that FIG. 4 may comprise the full semi-span panel of a low aspect ratio wing aircraft, or merely the tip portion of an aircraft having a wing of somewhat higher aspect ratio. Illustratively, FIG. 1 could have the FIG. 4 type of wing semi-span panels wherein the FIG. 4 centerline could either be coincident with the aircraft's longitudinal axis or be spanwisely spaced therefrom similarly to sweptback tip portion 92 of FIG. 1.

In FIG. 4, the sweptback wing tip 50, contains duct 52, terminating at leading edge 128 thereof and supplies a tip blowing jet 51. In order to cause the nozzle efflux to spiral upwardly over the tip leading edge 128 and travel generally chordwisely over the adjacent upper surface essentially without separation, as shown by the local flow streamlines of FIGURE 4, a series of flow directing vanes 120 are provided in the duct adjacent to the nozzle 51. These prevent the jet efflux from tending to discharge over the upper surface substantially normal to the sweptback leading edge which would result in disrupting crossflow, as in fact does occur in such configurations wherein the blowing jet lacks suitable flow directing vanes.

It will be understood that the blowing jet is primarily advantageous in relatively low speed flight in preventing formation of the leading edge captive vortex with concomitant lift and drag penalties, as is characteristic of appreciably swept wings at the higher angles-of-attack, and that at cruising speeds the aerodynamic effects of the blowing jet will generally not be advantageous. While this may be controlled by suitable complete shut-off valve means in duct 52, or at the fluid-flow power source as in FIG. 1, it may in some instances be preferred to use the control shown in FIGURE 5. In this form of the invention the duct adjacent to the sweptback leading edge 128 has the same flow directing vanes 120 as are shown in dotted lines in FIGURE 4, but the leading edge jet nozzle 51 provides variable efflux opening by means of an adjustable flap 130 controlled in any desired manner as by push-pull rod 131. It will be understood that shut-off of nozzle 51 by means of flap 130, is not an essential feature of the invention since, with undershot leading edge blowing wherein the jet discharges from the lower surface to control the flow over the upper surface, as herein disclosed illustratively but not limitatively, the efflux openings 51 and 108 of FIG. 3 etc., will in all cases be relatively narrow and approximately coincident with the airfoil entry stagnation point at cruise lift coefficients, with consequent minimal effect of an inoperative jet upon drag at normal operating speeds.

I claim as my invention:

1. An aircraft wing having a sweptback leading edge surface relative to the freestream flow thereover, means defining a series of rearwardly and outwardly directed nozzles adjacently disposed in said surface, power means selectively operable to provide pressurized fluid flow to said nozzles and effective to discharge relatively high velocity blowing jets therefrom flowing in semi-volute streamline paths upwardly and over said surface and remaining effectively attached thereto in general alignment with the contiguous local flow thereover and over said wing, whereby the lift of said wing is increased and the drag thereof concurrently reduced by said blowing jets.

2. An aircraft wing as in claim 1, wherein said wing has wing tip portions, trailing edge control surface means mounted on each of said wing tip portions, blowing jet control means energized by said power means and disposed on the trailing edge of said wing tip portions and juxtaposed to the lower leading edges of said control surfaces directing relatively high velocity jet discharge thereover, selectively adjustable means operating said control surface means, whereby said control surface flow control means are effective to provide control for said aircraft irrespective of said freestream flow.

3. An aircraft wing as in claim 1, wherein means are provided to control the jet emission from said nozzles.

4. An aircraft operatively characterized by local flow thereover having a longitudinal axis and a wing with a swept entry surface relative to said axis, efflux nozzle means in said surface, power means productive of pressurized fluid flow, guide vanes in said nozzle means directed rearwardly and outwardly relative to said axis, and duct means communicating with said means, whereby a relatively high velocity blowing jet is discharged from said nozzle means in a semi-volute streamline path over at least part of said entry surface and remains effectively attached thereto in general alignment with said local flow thereover and downstreamwardly over said wing.

5. An aircraft as in claim 4, wherein said efflux means are asymmetrically disposed in said surface.

References Cited in the file of this patent
UNITED STATES PATENTS 2,478,793    Trey ------------------ Aug. 9, 1949